United States Patent
Kim et al.

(10) Patent No.: US 10,690,908 B2
(45) Date of Patent: Jun. 23, 2020

(54) HEAD DEVICE OF THREE-DIMENSIONAL MODELING EQUIPMENT HAVING UNIDIRECTIONALLY ROTATING POLYGON MIRRORS, SCANNING METHOD FOR MODELING PLANE USING SAME, AND THREE-DIMENSIONAL MODELING DEVICE USING SAME

(71) Applicant: Korea Institute of Industrial Technology, Chungcheongnam-do (KR)

(72) Inventors: Seung Taek Kim, Chungcheongnam-do (KR); Moon Soo Park, Gyeonggi-do (KR); Young June Cho, Gyeonggi-do (KR); Deok Keun Lee, Gyeonggi-do (KR); Jong Seok Kim, Gyeonggi-do (KR); Hyung Tae Kim, Seoul (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 387 days.

(21) Appl. No.: 15/519,749

(22) PCT Filed: Oct. 29, 2014

(86) PCT No.: PCT/KR2014/010260
§ 371 (c)(1),
(2) Date: Apr. 17, 2017

(87) PCT Pub. No.: WO2016/060315
PCT Pub. Date: Apr. 21, 2016

(65) Prior Publication Data
US 2017/0261743 A1    Sep. 14, 2017

(30) Foreign Application Priority Data
Oct. 16, 2014  (KR) .................. 10-2014-0139616

(51) Int. Cl.
*B33Y 30/00* (2015.01)
*G02B 26/12* (2006.01)
(Continued)

(52) U.S. Cl.
CPC .......... *G02B 26/127* (2013.01); *B29C 64/386* (2017.08); *B33Y 30/00* (2014.12);
(Continued)

(58) Field of Classification Search
CPC .. G02B 26/127; G02B 26/128; G02B 26/129; G02B 26/101; B22F 3/1055; B22F 3/1056; B29C 64/10
See application file for complete search history.

(56) References Cited

U.S. PATENT DOCUMENTS 7,713,780 B2   5/2010  Hong et al.
8,880,209 B2   11/2014  Yasukochi
(Continued)

FOREIGN PATENT DOCUMENTS

EP      0863806 A1 *  9/1998  .......... B29C 64/153
JP      2010-089364 A  4/2010
(Continued)

OTHER PUBLICATIONS

International Search Report (PCT/ISA/210) dated Jun. 29, 2015, by the Korean Intellectual Property Office as the International Searching Authority for International Application No. PCT/KR2014/010260.
(Continued)

*Primary Examiner* — Jacob T Minskey
*Assistant Examiner* — Cedrick S Williams
(74) *Attorney, Agent, or Firm* — Rabin & Berdo, P.C.

(57) ABSTRACT

A head device of three-dimensional modeling equipment is disclosed which has unidirectionally rotating polygon mirrors, can perform biaxial scanning at a high speed due to a
(Continued)

combination of the mirrors, can easily control timing and a modeling ray irradiation position, and can enhance modeling precision. A scanning method for a modeling plane using the same is also disclosed.

13 Claims, 10 Drawing Sheets

(51) Int. Cl.
*H04N 1/113* (2006.01)
*G02B 26/10* (2006.01)
*B29C 64/386* (2017.01)
*B33Y 50/02* (2015.01)
*G05B 19/4099* (2006.01)

(52) U.S. Cl.
CPC .............. *B33Y 50/02* (2014.12); *G02B 26/10* (2013.01); *G02B 26/101* (2013.01); *G05B 19/4099* (2013.01); *H04N 1/113* (2013.01); *G05B 2219/49023* (2013.01)

(56) References Cited

U.S. PATENT DOCUMENTS

| | | |
|---|---|---|
| 2008/0076234 A1 | 3/2008 | Hong et al. |
| 2012/0130530 A1* | 5/2012 | Yasukochi ............ B29C 64/112 700/120 |
| 2014/0265034 A1* | 9/2014 | Dudley .................. B33Y 30/00 264/401 |
| 2017/0038690 A1* | 2/2017 | Jamar ................. G03F 7/70391 |

FOREIGN PATENT DOCUMENTS

| | | |
|---|---|---|
| KR | 1996-0024766 A | 7/1996 |
| KR | 10-2006-0003958 A | 1/2006 |
| KR | 10-2008-0028559 A | 4/2008 |

OTHER PUBLICATIONS

Written Opinion (PCT/ISA/237) dated Jun. 29, 2015, by the Korean Intellectual Property Office as the International Searching Authority for International Application No. PCT/KR2014/010260.

\* cited by examiner

HEAD DEVICE OF THREE-DIMENSIONAL MODELING EQUIPMENT HAVING UNIDIRECTIONALLY ROTATING POLYGON MIRRORS, SCANNING METHOD FOR MODELING PLANE USING SAME, AND THREE-DIMENSIONAL MODELING DEVICE USING SAME

CROSS-REFERENCE TO RELATED APPLICATION

This application claims priority to and the benefit of Korean Patent Application No. 10-2014-0139616, filed on Oct. 16, 2014, the disclosure of which is incorporated herein by reference in its entirety.

BACKGROUND OF THE INVENTION

Field of the Invention

The present invention relates to the head apparatus of the three-dimensional modeling equipment and a method for scanning a modeling plane using the same and, more particularly, to the head apparatus of the three-dimensional modeling equipment which has a configuration including polygon mirrors that rotate in one direction, can perform 2-axis scanning at high speed by a combination of the polygon mirrors, can easily control timing and a location to which a modeling beam is radiated, and has an advantage of improving modeling precision, and a method for scanning a modeling plane using the same.

Description of the Related Art 3D printing is one of methods for fabricating a product, and has been chiefly used to fabricate a prototype because it has a smaller loss of materials than conventional cutting processing due to the use of a stacking method and it consumes a relatively low production cost. Recently, the possibility of the technology of this field as a next-generation production technology has been recognized in addition to the fabrication of a prototype. The reason for this is that the fabrication speed has been increased, the completeness (resolution) of an output matter has been enhanced, available materials have been diversified, and the availability of individuals has been improved to the small size of an apparatus. Such a 3D printing method includes methods, such as a stereo lithography apparatus (SLA), selective laser sintering (SLS), and fused deposition modeling (SDM).

Korean Patent Application Publication No. 1996-0024766 (Title of the Invention: 3D model forming apparatus using beam modeling apparatus, hereinafter referred to as a "prior art 1") discloses a 3D model forming apparatus, including a controller which corrects a control pulse based on a signal fed back by a motor so that the motor is rotated at a target speed, a motor driver which supplies a driving voltage to the motor0∥ in response to the control pulse output by the controller, a laser oscillation unit which generates a laser beam, and an attenuator which attenuates a laser beam output to the scan lens side in response to the driving voltage, in order to solve a problem in that a model is deformed into an unwanted structure because the radiation time of a laser beam becomes longer than a steady movement section in an acceleration and deceleration section that appears near the driving start point and driving end point of a servo motor with respect to a beam modeling apparatus of an X-Y plotter method.

SUMMARY OF THE INVENTION

Technical Problem

The prior art 1, such as that shown in FIG. 1, has a first problem in that control precision is deteriorated compared to a method of controlling a beam path because a head directly moves to a beam radiation point through a 2-axis moving rail and radiates a modeling beam, a second problem in that modeling quality is deteriorated because the relatively heavy head is directly moved and vibration is generated due to the acceleration or deceleration of the head, and a third problem in that such a vibration problem becomes further severe when a modeling speed is increased.

Solution to the Problem

In the present invention, in order to implement the radiation of a modeling beam not having an omitted portion with respect to a one modeling plane, the head does not directly move to a modeling portion and does not radiate a modeling beam. Instead, two sets of optical elements called polygon mirrors are properly arranged in the space, and the angular displacement and angular speed of two polygon mirrors and a modeling beam source unit for generating a modeling beam are controlled so that they operate in conjunction with each other. Furthermore, since the polygon mirrors are rotated in one direction, a vibration possibility generated due to the stop or acceleration of the polygon mirror and a change in the rotating direction of the polygon mirror can be minimized, and a modeling speed can be increased. Furthermore, the modeling beam source unit is controlled or a separate element is introduced in order to correct a difference in the modeling beam output power density in each incident point of a modeling plane and a difference in the path length of a modeling beam.

Advantageous Effect(s) of the Invention

The present invention has a first advantage in that the radiation of a modeling beam can be performed at high speed because the polygon mirrors rotating in a single direction are adopted and the polygon mirror continues to rotate without a stop, a second advantage in that vibration and noise generated by the head apparatus can be reduced and thus quality of a modeling layer formed in a modeling plane 10 can be improved because control is performed through control of the rotating angular speed and rotating angular displacement of the two polygon mirrors in controlling the radiation location of a modeling beam, and a third advantage in that modeling quality can be improved by controlling the output value of a modeling beam through a controller or implementing uniform modeling beam output power density with respect to the entire modeling plane 10 by applying a modeling beam incident angle correction unit 50. Furthermore, the present invention may be applied to three-dimensional modeling apparatuses of various methods including the SLA or SLS method.

DERAILED DESCRIPTION OF THE PREFERRED EMBODIMENTS

Figure 1:
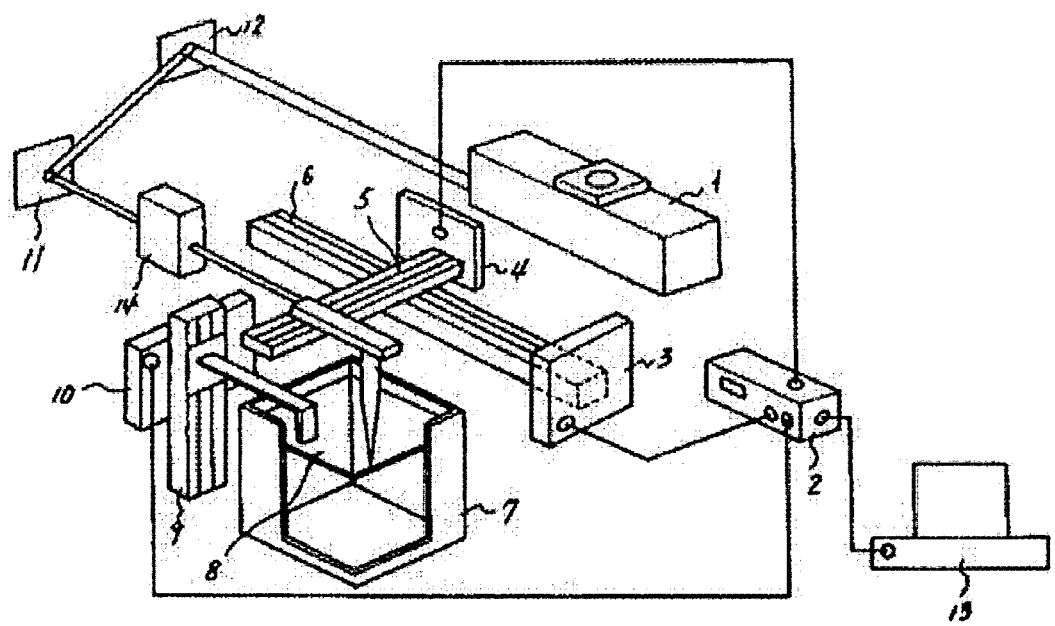
FIG. 1 is a perspective view showing the configuration of a conventional technology.

The head apparatus of three-dimensional modeling equipment according to the present invention may include, in order to implement a function to radiate a modeling beam to the entire surface of a modeling plane 10 perpendicular to a third axis 3 and including a first axis 1 and a second axis 2 in a specific scanning pattern, the first axis 1 and the second axis 2 being perpendicular to each other, a modeling beam source unit 15 which generates the modeling beam, a first light guide unit 20 disposed at a specific location over the modeling plane 10 and having a function to primarily reflect the modeling beam from the modeling beam source unit 15 and to enable the primarily reflected modeling beam to be incident on a second light guide unit 30, the second light guide unit 30 disposed at a specific location over the modeling plane 10 and having a function to secondarily reflect the modeling beam incident from the first light guide unit 20 and to enable the secondarily reflected modeling beam to be incident on the modeling plane 10, and a control unit 40 which generates the on/off and output power of the modeling beam and the driving of the first light guide unit 20 and the second light guide unit 30 by associating the first light guide unit 20 and the second light guide unit 30. At least one of the first light guide unit 20 and the second light guide unit 30 may include a polygon mirror having a specific number of light reflection surfaces on the side thereof and rotating in one direction around a specific rotating axis.

Furthermore, the head apparatus of the three-dimensional modeling equipment of the present invention may further include a modeling beam incident angle correction unit 50 having a function to enable the modeling beam to be vertically incident on the modeling plane 10 in all of points forming the modeling plane 10.

In the head apparatus of the three-dimensional modeling equipment of the present invention, the control unit 40 may control the pulse amplitude or pulse frequency of the modeling beam in order to correct a difference in the path length which is necessary for the modeling beam to reach each of points forming the modeling plane 10 or a difference in output power density of a modeling beam in each of the points which is caused depending on a difference in the incident angle of the modeling beam.

In the head apparatus of the three-dimensional modeling equipment of the present invention, the control unit 40 may include a first photosensor 41 having a function to determine the start timing of each of a plurality of line scans in a direction parallel to the second axis 2 by sensing a modeling beam incident on a specific point and to synchronize the driving of the modeling beam source unit 15 and the driving of the first light guide unit 20 or the second light guide unit 30.

In the head apparatus of the three-dimensional modeling equipment of the present invention, the control unit 40 may further include a fourth photosensor 44 having a function to determine end timing of each of a plurality of line scans in the direction parallel to the second axis 2 by sensing a modeling beam incident on a specific point and to synchronize the driving of the modeling beam source unit 15 and the driving of the first light guide unit 20 or the second light guide unit 30.

In the head apparatus of the three-dimensional modeling equipment of the present invention, the control unit 40 may include a second photosensor 42 having a function to determine first start timing of the radiation of a modeling beam to the modeling plane 10 by sensing the modeling beam incident on a specific location of the modeling plane 10 and to synchronize the driving of the modeling beam source unit 15 and the driving of the first light guide unit 20 or the second light guide unit 30.

In the head apparatus of the three-dimensional modeling equipment of the present invention, the control unit 40 may further include a third photosensor 43 having a function to determine the final end timing of the radiation of a modeling beam to the modeling plane 10 by sending the modeling beam incident on a specific location of the modeling plane 10.

In the head apparatus of the three-dimensional modeling equipment of the present invention, the modeling beam may be incident on the first light guide unit 20 while forming a specific angle to the second axis 2. The scanning pattern may be a pattern formed as a plurality of line scans having a direction parallel to the second axis 2 is stepped at a specific interval in the direction of the first axis 1.

The first light guide unit 20 of the head apparatus of the three-dimensional modeling equipment of the present invention may include a first polygon mirror 21. The first polygon mirror 21 may be disposed using a fourth axis 4 parallel to the first axis 1 as its rotating central axis. The second light guide unit 30 may include a second polygon mirror 31. The second polygon mirror 31 may be disposed using a fifth axis 5 parallel to the third axis 3 as its rotating central axis. The plurality of line scans in the direction parallel to the second axis 2 may be performed as the first polygon mirror 21 is rotated. The stepping at the specific interval in the direction of the first axis 1 may be performed as the second polygon mirror 31 is rotated.

A method for scanning the modeling plane 10 according to the present invention includes the steps of, first, rotating, by the first polygon mirror 21, in one direction and starting, by the modeling beam source unit 15, to have a modeling beam incident on the first polygon mirror 21; second, enabling a modeling beam primarily reflected by the first polygon mirror 21 to be secondarily reflected by the second polygon mirror 31 and then to perform a line scan on the modeling plane 10 in the direction parallel to the second axis 2 while the first polygon mirror 21 continues to rotate at a specific speed; third, controlling the modeling beam 11 so that the modeling beam 11 is not radiated to the modeling plane 10, thereby terminating the line scan in the step (ii); fourth, rotating, by the second polygon mirror 31, at specific angular displacement and continuing to rotate, by the first polygon mirror 21, in the same rotating direction until a next reflection surface adjacent to a previous reflection surface reaches a specific location in order to perform a next line scan after stepping at a specific interval in the direction of the first axis 1 after the line scan in the second step; and fifth, repeatedly performing the step (i) to the step (iv) until the radiation of the modeling beam to the entire surface of the modeling plane 10 is completed. The first polygon mirror 21 may be rotated only in a single direction.

The method for scanning the modeling plane 10 according to the present invention may further include the step of preparing, by the second polygon mirror 31, rotation in the direction identical with the rotating direction in the fifth step after the fifth step.

The method for scanning the modeling plane 10 according to the present invention may further include the step of preparing, by the second polygon mirror 31, rotation in the direction opposite the rotating direction in the fifth step after the fifth step.

In the method for scanning the modeling plane 10 according to the present invention, the rotation of the second polygon mirror 31 and the rotation of the first polygon mirror 21 in the fourth step may be simultaneously performed.

In the head apparatus of the three-dimensional modeling equipment of the present invention, the modeling beam may be incident on the first light guide unit 20 while forming a specific angle to the second axis 2. The scanning pattern may be a pattern formed as a plurality of line scans having a direction parallel to the first axis 1 is stepped at a specific interval in the direction of the second axis 2.

In the head apparatus of the three-dimensional modeling equipment of the present invention, the first light guide unit 20 may include a third polygon mirror 22. The third polygon mirror 22 may be disposed using a sixth axis 6 parallel to the first axis 1 as its rotating central axis. The second light guide unit 30 may include a fourth polygon mirror 32. The fourth polygon mirror 32 may be disposed using a seventh axis 7 parallel to the third axis 3 as its rotating central axis. The line scan in the direction parallel to the first axis 1 may be performed as the fourth polygon mirror 32 is rotated. The stepping at the specific interval in the direction of the second axis 2 may be performed as the third polygon mirror 22 is rotated.

A method for scanning the modeling plane 10 according to the present invention includes the steps of, first, rotating, by the fourth polygon mirror 32, in one direction and starting, by the modeling beam source unit 15, to have a modeling beam incident on the third polygon mirror 22; second, enabling a modeling beam primarily reflected by the third polygon mirror 22 to be secondarily reflected by the fourth polygon mirror 32 and then to perform a line scan on the modeling plane 10 in the direction parallel to the first axis 1 while the fourth polygon mirror 32 continues to rotate at a specific speed; third, controlling the modeling beam 11 so that the modeling beam 11 is not radiated to the modeling plane 10, thereby terminating the line scan in the step (ii); fourth, rotating, by the third polygon mirror 22, at specific angular displacement and continuing to rotate, by the fourth polygon mirror 32, in the same rotating direction until a next reflection surface adjacent to a previous reflection surface reaches a specific location in order to perform a next line scan after stepping at a specific interval in the direction of the second axis 2 after the line scan in the second step; and fifth, repeatedly performing the first step to the fourth step until the radiation of the modeling beam to the entire surface of the modeling plane 10 is completed. The fourth polygon mirror 32 may be rotated in one specific direction only.

The method for scanning a modeling plane according to the present invention may further include the step of preparing, by the third polygon mirror 22, rotating in the direction identical with the rotating direction in the fifth step after the fifth step.

The method for scanning a modeling plane according to the present invention may further include the step of preparing, by the third polygon mirror 22, rotation in the direction opposite the rotating direction in the fifth step after the fifth step.

In the method for scanning a modeling plane according to the present invention, the rotation of the third polygon mirror 22 and the rotation of the fourth polygon mirror 32 in the fourth step may be simultaneously performed.

In the head apparatus of the three-dimensional modeling equipment of the present invention, the first light guide unit 20 may include a fifth polygon mirror 23. The fifth polygon mirror 23 may be disposed using an eighth axis 8 having a specific angle to the third axis 3 as its rotating central axis. The second light guide unit 30 may include a sixth polygon mirror 33. The sixth polygon mirror 33 may be disposed using a ninth axis 9 parallel to the first axis 1 as its rotating central axis. A plurality of line scans in the direction parallel to the first axis 1 may be performed as the fifth polygon mirror 23 is rotated. The stepping at the specific interval in the direction of the second axis 2 may be performed as the sixth polygon mirror 33 is rotated.

A method for scanning the modeling plane 10 according to the present invention includes the steps of, first, rotating, by the fifth polygon mirror 23, in one direction and starting, by the modeling beam source unit 15, to have a modeling beam incident on the fifth polygon mirror 23; second, enabling a modeling beam primarily reflected by the fifth polygon mirror 23 to be secondarily reflected by the sixth polygon mirror 33 and then to perform a line scan on the modeling plane 10 in the direction parallel to the first axis 1 while the fifth polygon mirror 23 continues to rotate at a specific speed; third, controlling the modeling beam 11 so that the modeling beam 11 may be not radiated to the modeling plane 10, thereby terminating the line scan in the step (ii); fourth, rotating, by the sixth polygon mirror 33, at specific angular displacement and continuing to rotate, by the fifth polygon mirror 23, in the same rotating direction until a next reflection surface adjacent to a previous reflection surface reaches a specific location in order to perform a next line scan after stepping at a specific interval in the direction of the second axis 2 after the line scan in the second step; and fifth, repeatedly performing the step (i) to the (iv) step until the radiation of the modeling beam to the entire surface of the modeling plane 10 is completed. The fifth polygon mirror 23 may be rotated in one specific direction only.

The method for scanning the modeling plane 10 according to the present invention may further include the step of preparing, by the sixth polygon mirror 33, rotation in the direction identical with the rotating direction in the fifth step after the fifth step.

The method for scanning the modeling plane 10 according to the present invention may further include the step of preparing, by the sixth polygon mirror 33, rotation in the direction opposite the rotating direction in the fifth step after the fifth step.

In the method for scanning the modeling plane 10 according to the present invention, the rotation of the fifth polygon mirror 23 and the rotation of the sixth polygon mirror 33 in the fourth step may be simultaneously performed.

In the head apparatus of the three-dimensional modeling equipment of the present invention, the first light guide unit may include a seventh polygon mirror 24. The seventh polygon mirror 24 may be disposed using a tenth axis 10x parallel to the third axis 3 as its rotating central axis. The second light guide unit 30 may include an eighth polygon mirror 34. The eighth polygon mirror 34 may be disposed using an eleventh axis 11x parallel to the first axis 1 as its rotating central axis. A plurality of line scans in the direction parallel to the second axis 2 may be performed as the eighth polygon mirror 34 is rotated. The stepping at the specific interval in the direction of the first axis 1 may be performed as the seventh polygon mirror 24 is rotated.

A method for scanning a modeling plane according to the present invention includes the steps of, first, rotating, by the eighth polygon mirror 34, in one direction and starting, by the modeling beam source unit 15, to have a modeling beam incident on the seventh polygon mirror 24; second, enabling a modeling beam primarily reflected by the seventh polygon mirror 24 to be secondarily reflected by the eighth polygon mirror 34 and then to perform a line scan on the modeling plane 10 in the direction parallel to the second axis 2 while the eighth polygon mirror 34 continues to rotate at a specific speed; third, controlling the modeling beam 11 so that the modeling beam 11 is not radiated to the modeling plane 10, thereby terminating the line scan in the second step; fourth, rotating, by the seventh polygon mirror 24, at specific angular displacement and continuing to rotate, by the eighth polygon mirror 34, in the same rotating direction until a next reflection surface adjacent to a previous reflection surface reaches a specific location in order to perform a next line scan after stepping at a specific interval in the direction of the first axis 1 after the line scan in the second step; and fifth, repeatedly performing the first step to the fourth step until the radiation of the modeling beam to the entire surface of the modeling plane 10 is completed. The eighth polygon mirror 34 may be rotated in one specific direction only.

The method for scanning a modeling plane according to the present invention may further include the step of preparing, by the seventh polygon mirror 24, rotation in the direction identical with the rotating direction in the fifth step after the fifth step.

The method for scanning a modeling plane according to the present invention may further include the step of preparing, by the seventh polygon mirror 24, rotation in the direction opposite the rotating direction in the fifth step after the fifth step.

In the method for scanning a modeling plane according to the present invention, the rotation of the seventh polygon mirror 24 and the rotation of the eighth polygon mirror 34 in the fourth step may be simultaneously performed.

Furthermore, a three-dimensional modeling apparatus of the present invention may include the aforementioned head apparatus.

Embodiment(s)

Figure 2:
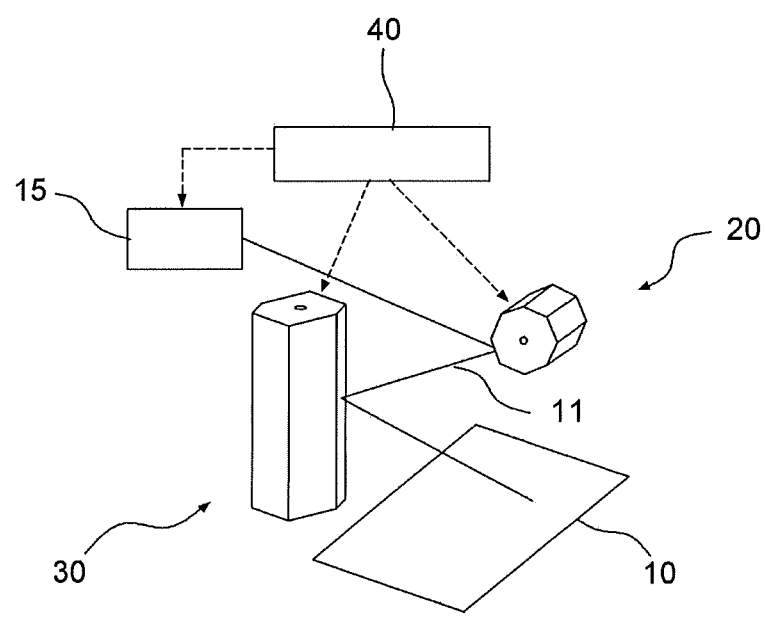
FIG. 2 is an explanatory diagram showing the configuration of one embodiment of the head apparatus of the three-dimensional modeling equipment according to the present invention.

The head apparatus of three-dimensional modeling equipment according to the present invention includes a modeling beam source unit 15 which generates a modeling beam, a first light guide unit 20 which has a modeling beam incident on a second light guide unit 30 by primarily reflecting the modeling beam, the second light guide unit 30 which functions to have a modeling beam received from the first light guide unit 20 incident on a modeling plane 10 by secondarily reflecting the received modeling beam, and a control unit 40 which controls the on/off and output power of a modeling beam and the driving of the first light guide unit 20 and the second light guide unit 30 so that they operate in conjunction with each other as major elements. The head apparatus functions to radiate a modeling beam to the entire modeling plane 10 in a specific scanning pattern. A schematic diagram of such a configuration is shown in FIG. 2.

Related terms are defined below prior to a description of the present invention in such a way as to describe the major elements and embodiments.

The modeling plane 10 also means a region in which a modeling beam whose path is controlled is radiated in the head apparatus of the three-dimensional modeling equipment according to the present invention, and also means a logical region which includes a first axis 1 and a second axis 2 that are perpendicular to each other and in which a location on the plane of the region is described as coordinate values according to the first axis 1 and the second axis 2 in order to mathematically represent the region in which a modeling beam is actually radiated. An actual modeling plane 10 may be directly exposed to the outside or may have a state shielded by a transparent member through which a modeling beam can pass although the modeling beam is not directly radiated to the modeling plane. Furthermore, the modeling plane 10 may also be represented as an effective forming region in that energy is applied to a modeling beam and the generation of an action, such as photo curing or sintering curing, is limited to the region of the modeling plane 10.

The first axis 1, the second axis 2 or a third axis 3 is a criterion in describing a relation between the scanning direction and pattern of a modeling beam or the location of a polygon mirror rotating axis with respect to the modeling plane 10 to be described later. The third axis 3 is an axis perpendicular to both the first axis 1 and the second axis 2. The first axis 1 and the second axis 2 are randomly located on an actual modeling plane 10.

The modeling beam source unit 15 functions to generate a modeling beam and to enable the modeling beam to be incident on the first light guide unit 20 to be described later. The modeling beam is not limited to the type of light, such as ultraviolet rays (UV rays) or a laser, because it has only to have energy necessary to cure a modeling material used. In this case, a laser is suitable for use as a modeling beam because high energy can be condensed and output intensity and on/off control of the laser can be easily controlled if the laser is used. The output and wavelength of a laser needs to be determined in accordance with a modeling material used. In order to generate a laser, a device, such as a laser diode (LD) or a VCSEL, may be used, but is not limited thereto. A single device does not need to be used because a beam of a single channel is used as a modeling beam. A laser array may be formed using a plurality of devices, and beams from the laser array may be condensed as a single laser beam using a relay module. Furthermore, the improvement of quality of a modeling beam or the design of a configuration for reducing the size of the head apparatus by applying various optical elements, such as an optical modulation module, a condensing lens, and a prism, may also be taken into consideration.

The first light guide unit 20 and the second light guide unit 30 are located in the space over the modeling plane 10 so that they are not parallel to each other. The first light guide unit 20 and the second light guide unit 30 continuously determine the location where a modeling beam is radiated with respect to time so that an omitted portion is not generated in scanning for the modeling plane 10. From a viewpoint of a modeling beam, a modeling beam from the modeling beam source unit 15 is primarily reflected by the first light guide unit 20 and incident on the second light guide unit 30, and is then secondarily reflected by the second light guide unit 30 and incident on the modeling plane 10. The present invention proposes that one or more of the first light guide unit 20 and the second light guide unit 30 has a specific number of light reflection surfaces on its side and includes a polygon mirror that rotates in one direction around a specific rotating axis. A cross-sectional shape of the polygon mirror, which is perpendicular to a rotating axis, needs to be a polygon, and a lateral surface of the polygon mirror needs to be configured to reflect a modeling beam. More preferably, if a polygon mirror whose cross-sectional shape is a regular polygon is adopted, it is advantageous because the rotating speed and rotating direction of the polygon mirror can be precisely controlled. The cross section of the polygon mirror may be a regular quadrilateral, a regular pentagon, a regular hexagon or a regular octagon, but is not limited thereto. As will be described later, there is an advantage in that the length of a (e.g., regular quadrilateral) line scan can be increased as the parameter of a regular polygon in the cross section of a polygon mirror is reduced because once line scan is performed by one side reflection surface of the polygon mirror. However, there is a disadvantage in that the rotating speed of the polygon mirror needs to be increased in order to produce the same modeling speed because the rotating angular displacement of the polygon mirror needs to be increased in order to perform one line scan. Accordingly, it is necessary to trade off the advantage and the disadvantage by selecting a polygon mirror having a proper shape depending on the size of the modeling plane 10. Furthermore, the side reflection surface may be a rectangle or trapezoid having the same shape and size. In this case, a general shape of the polygon mirror may be a regular polygon post or a regular polygon horn post. The polygon mirror may be configured to have a shape having any one of a regular polygon post and a regular polygon horn post depending on an angle at which the rotating axis of the polygon mirror has been installed, the incident angle of a modeling beam, a location between the first light guide unit 20 and the second light guide unit 30, or the size of the head apparatus of the present invention. In embodiments of FIGS. 2 to 8, the first light guide unit 20 has been implemented to have a shape of a regular octagon post and the second light guide unit 30 has been implemented to have a shape of a regular hexagon post.

The rotating axis of the polygon mirror may be disposed at a specific location over the modeling plane 10 in various manners. Furthermore, reflection surface processing needs to be performed on the top and bottom surfaces of the polygon mirror in addition to the side of the polygon mirror. This is described later because it is related to a first photo-sensor 41. Furthermore, such a polygon mirror may be applied to both the first light guide unit 20 and the second light guide unit 30, but may be applied to only one of the first light guide unit 20 and the second light guide unit 30.

The first light guide unit 20 first receives a modeling beam. In general, the incident direction of the modeling beam incident from the modeling beam source unit 15 has been fixed. Accordingly, the length of the first light guide unit 20 in its rotating axis direction may be relatively short. In contrast, the second light guide unit 30 is configured to secondarily reflect a modeling beam primarily reflected by the first light guide unit 20. The length of the second light guide unit 30 in its rotating axis direction needs to be set to be relatively long.

The control unit 40 associates and controls the modeling beam source unit 15, the first light guide unit 20 and the second light guide unit 30. A detailed target to be controlled by the control unit 40 may be the on/off and output value of a modeling beam, the driving of the first light guide unit 20 and the second light guide unit 30 and so on. A radiation location may be specified with respect to the modeling plane of a modeling beam depending on control of the rotating angle of the first light guide unit 20 and the second light guide unit 30. A modeling layer may be formed at the specified radiation location by controlling the on/off of the modeling beam based on information about an image of the modeling layer. The control unit 40 basically includes a processing unit for generating a proper control signal with respect to a control parameter and a driving unit for driving a corresponding element by processing the control signal generated by the processing unit. The processing unit may be implemented using hardware, such as a circuit, or may be configured in software, such as a program. Control of the on/off of a modeling beam may be performed by controlling the on/off of a modeling beam generation device-LD or VCSEL or may be implemented through control of additional elements, such as a shutter for selectively transmitting or blocking a modeling beam generated by the modeling beam generation device over time, but the present invention is not limited thereto. More specifically, control of the output value of a modeling beam includes controlling the amplitude or frequency of a pulse which forms a modeling beam. This is required to correct a difference between beam path lengths that are necessary for a modeling beam to reach each of points that form the modeling plane 10 or a difference in the output power density of a modeling beam at each point which is caused depending on a difference between the incident angles of modeling beams. This is described in detail below. When a modeling beam is vertically incident on the modeling plane 10, the incident area of the modeling beam is a minimum, and thus output power density of the modeling beam is increased. In contrast, when a modeling beam is incident on the modeling plane 10 at an oblique angle, the incident area of the modeling beam is increased, and thus output power density of the modeling beam is reduced. However, the degree of an action, such as the curing-photo curing or powder sintering of a modeling beam for a modeling material, is proportional to the size of modeling beam output power density. Accordingly, in order to secure quality of a modeling layer by guaranteeing uniform modeling beam output power density with respect to the entire area of the modeling plane 10, it is necessary to control the output value of the modeling beam as described above. Furthermore, in particular, if the size of the head apparatus of the present invention is increased, there will be a difference in the energy loss degree of a modeling beam depending on a beam path length that is necessary for the modeling beam to reach each of points forming the modeling plane 10. Accordingly, it is necessary to correct the difference.

Control of the first light guide unit 20 and the second light guide unit 30 by the control unit 40 is performed by controlling the rotation of the polygon mirror. Major control parameters include the rotating angular speed, rotating angular displacement and rotating angular acceleration of the polygon mirror. Such control parameters need to follow the control signal of the control unit 40 with a small error within a small lead time. To this end, an electromotive control method may be preferably used. More preferably, an electric servo-motor capable of implementing the rotating angular speed, rotating angular displacement, and rotating angular acceleration in response to a control signal (electrical signal) that varies over time may be used, but the present invention is not limited thereto.

Figure 7:
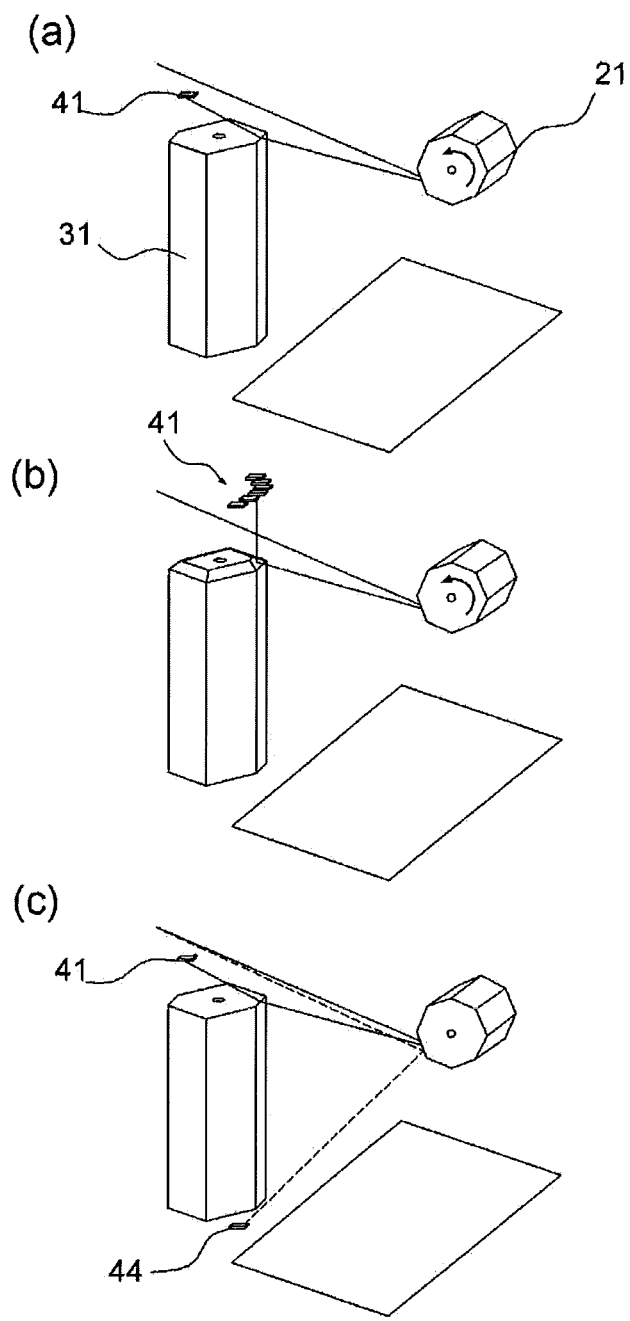
FIG. 7 is a perspective view showing one embodiment the head apparatus and first photosensor 41 of three-dimensional modeling equipment according to the present invention.

Furthermore, the control unit 40 may further include the first photosensor 41 having a function to determine the start timing of each of a plurality of line scans in the direction parallel to the first axis 1 or the second axis 2 by detecting a modeling beam incident on a specific point and to synchronize the driving of the modeling beam source unit 15 and the driving of the first light guide unit 20 or the second light guide unit 30, in controlling the driving of the polygon mirrors that form the first light guide unit 20 and the second light guide unit 30. One embodiment of the first photosensor 41 which may be applied to a '(1-1)-th configuration' to be described later is shown in FIG. 7. In the '(1-1)-th configuration', the first polygon mirror 21 performs a line scan while rotating in a single direction. A point at which a modeling beam reflected by the first polygon mirror 21 is incident on the side (reflection surface) of the second polygon mirror 31 is formed from top to bottom. A method for reflecting a modeling beam toward the top surface of the second polygon mirror 31 right before a next line scan is started after one line scan is terminated and disposing the first photosensor 41 in a corresponding path is taken into consideration (FIG. 7(*a*)). In the above embodiment, since the first light guide unit 20 is an element responsible for a line scan, the subject of synchronization control by the first photosensor 41 is the first light guide unit 20 and the modeling beam source unit 15. In a configuration (e.g., a (2-1)-th configuration) in which the second light guide unit 30 is an element responsible for a line scan, the subject of synchronization control by the first photosensor 41 may be the second light guide unit 30 and the modeling beam source unit 15.

FIG. 7(*b*) shows one embodiment in which tempering processing has been performed on the edge of the second light guide unit 30 (the second polygon mirror 31) so that the edge has an inclined plane having a specific tilt angle and a modeling beam reflected by the inclined plane is detected. In this case, in the (1-1)-th configuration, the second polygon mirror 31 is subjected to angular displacement of a specific angle. In order to continue to detect a modeling beam reflected by the tempered inclined plane for each line scan, the first photosensor 41 may be arranged in the form of a plurality of arrays as shown in FIG. 7(*b*). The output signal of the first photosensor 41 is transferred to the processing unit. The processing unit may determine the start timing of the line scan using the output signal, and may synchronize the modeling beam source unit 15 and the first light guide unit 20 (the first polygon mirror 21) using the start timing. The control unit 40 may perform control by precisely controlling only the angular displacement of the first light guide unit 20 (the first polygon mirror 21). However, when a process error and response delay inherent in a mechanical element, such as a servo motor, is taken into consideration, an effect of correcting such an error, etc. can be obtained through an additional element, such as the first photosensor 41. In conclusion, the first light guide unit 20 (the first polygon mirror 21) and the modeling beam source unit 15 may operate in conjunction with each other in response to the driving signal of the first light guide unit 20 and the driving signal of the modeling beam source unit 15, which are generated after the control unit 40 processes a signal generated by the first photosensor 41. Furthermore, the control unit 40 may further include a fourth photosensor 44 having a function to determine the end timing of each of a plurality of line scans in the direction parallel to the first axis 1 or the second axis 2 by detecting a modeling beam incident on a specific point and to synchronize the driving of the modeling beam source unit 15 and the driving of the first light guide unit 20 or the second light guide unit 30. For example, FIG. 7(*c*) shows one embodiment of a configuration in which the fourth photosensor is selectively further disposed under the second light guide unit 30 (the second polygon mirror 31) to determine the end timing of each line scan.

Figure 8:
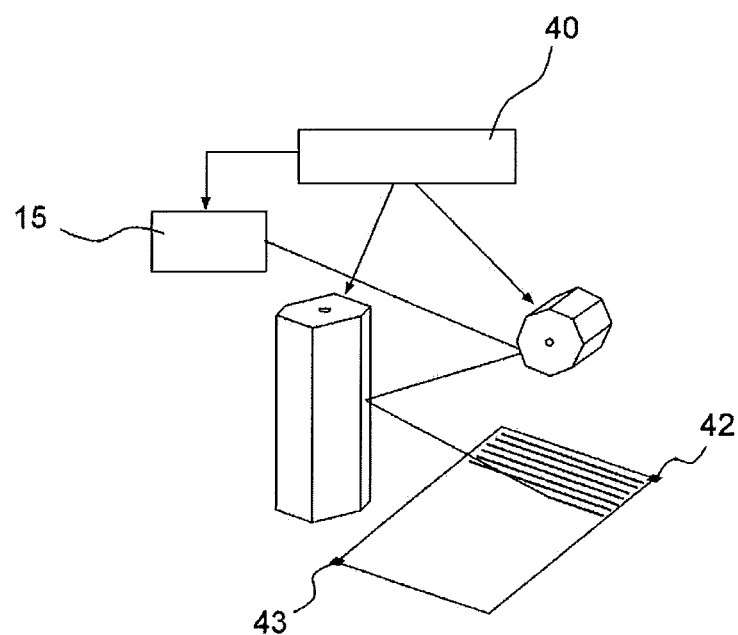
FIG. 8 is a perspective view showing one embodiment of the head apparatus, second photosensor 42, and third photosensor 43 of three-dimensional modeling equipment according to the present invention.

Furthermore, the control unit 40 may further include a second photosensor 42 having a function to determine the first start timing of the radiation of a modeling beam to the modeling plane 10 by detecting the modeling beam incident on a specific location of the modeling plane 10 and to synchronize the driving of the modeling beam source unit 15 and the driving of the second light guide unit 30. Furthermore, a third photosensor 43 having a function to determine the final end timing of the radiation of a modeling beam to the modeling plane 10 by detecting the modeling beam incident on a specific location of the modeling plane 10 may be further installed. In scanning the entire one modeling plane 10, the first start timing and final end timing of a modeling beam have a direct relation with the driving of an element that belongs to the first light guide unit 20 and the second light guide unit 30 and that is responsible for the stepping of each line scan. FIG. 8 shows one embodiment of the second photosensor 42 and the third photosensor 43 disposed in the '(1-1)-th configuration'. The first start timing and final end timing of a modeling beam radiated (scanned) to the modeling plane 10 are determined by the second photosensor 42 and the third photosensor 43. In this case, since the second light guide unit 30 (the second polygon mirror 31) is an element responsible for the stepping of a line scan, the second light guide unit 30 and the modeling beam source unit 15 are driven in conjunction with each other in response to the driving signal of the second light guide unit 30 and the driving signal of the modeling beam source unit 15, which are generated after the processing unit receives and processes the signals of the second photosensor 42 and the third photosensor 43.

Figure 9:
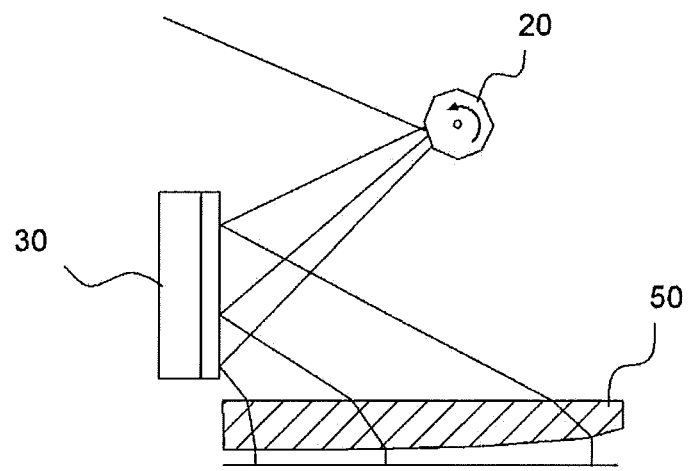
FIG. 9 is a cross-sectional view showing one embodiment of a modeling beam incident angle correction unit 50 of the present invention.

Furthermore, the head apparatus of the three-dimensional modeling equipment of the present invention may further include a modeling beam incident angle correction unit 50 having a function to enable a modeling beam to be vertically incident on the modeling plane 10 at all of points that form the modeling plane 10. As described above, this is to make output power density of a modeling beam uniform at each incident point. The modeling beam incident angle correction unit 50 according to one embodiment of FIG. 9 is a lens disposed over the modeling plane 10. The modeling beam incident angle correction unit 50 functions to induce a modeling beam, secondarily reflected by the second light guide unit 30, to be vertically incident on the modeling plane 10 after the modeling beam experiences twice refraction processes although the modeling beam has a different incident angle for each point.

To implement a specific scanning pattern by arranging the aforementioned major elements on the space is described below. An example in which a plurality of line scans is formed while they are stepped each other at specific intervals may be taken into consideration as an example of a scanning pattern on the modeling plane 10. Such a pattern is for improving the scanning speed as described above. Furthermore, in the scanning pattern, the direction of the line scan and the direction of the stepping need to be taken into consideration along with the incident direction of a modeling beam. In this case, the first axis 1, the second axis 2 and the third axis 3 are used as criteria and described below.

Figure 3:
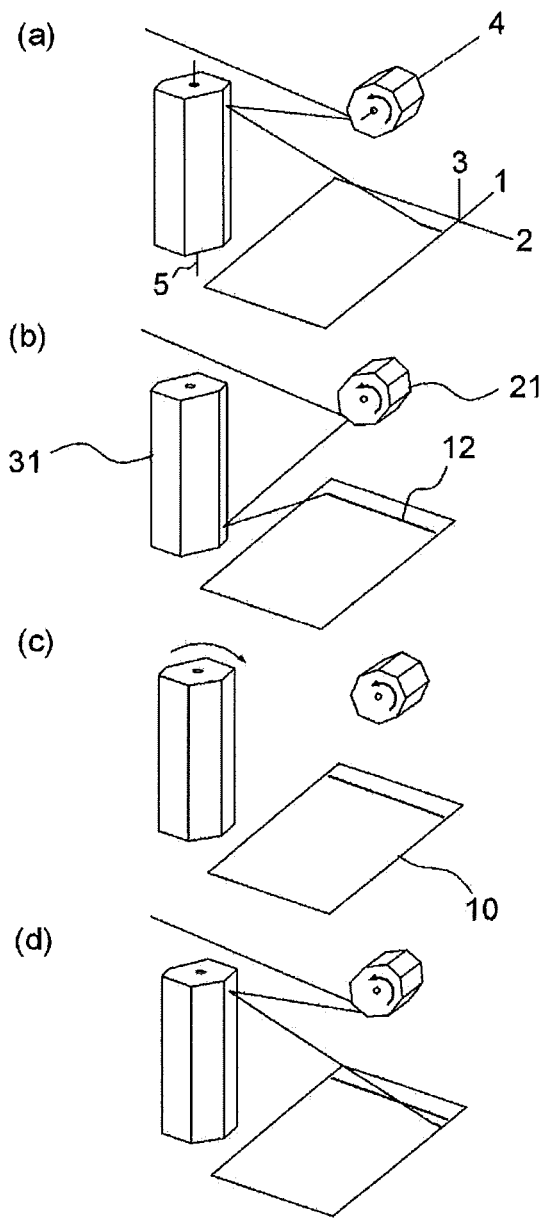
FIG. 3 is a perspective view showing one embodiment (a (1-1)-th configuration) of a method for scanning a modeling plane using the head apparatus of the three-dimensional modeling equipment according to the present invention.
Figure 6:
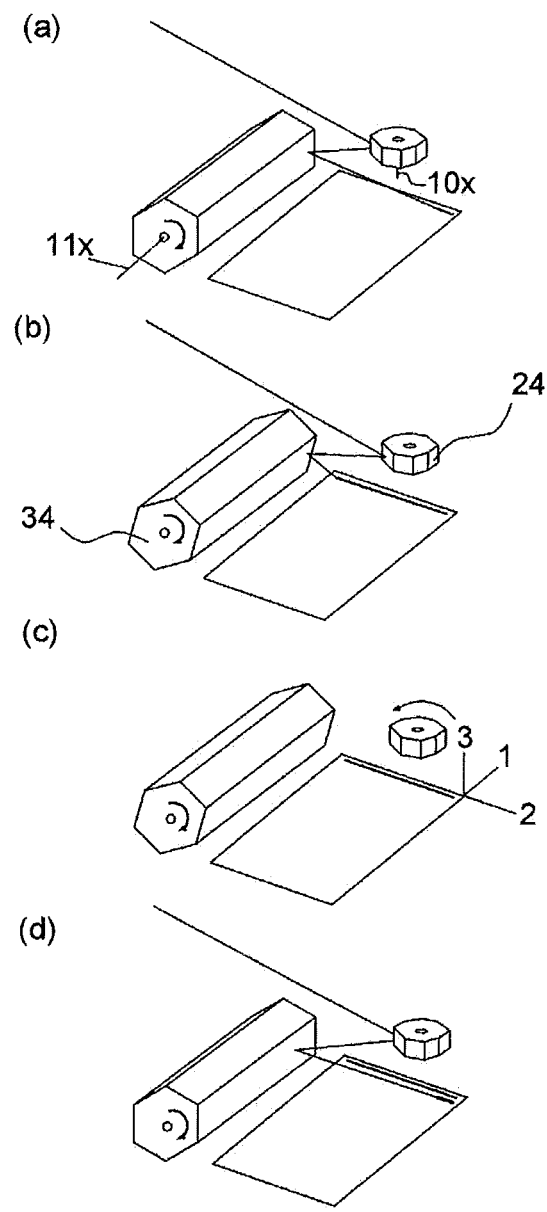
FIG. 6 is a perspective view showing one embodiment (a (1-2)-th configuration) of a method for scanning a modeling plane using the head apparatus of the three-dimensional modeling equipment according to the present invention.

A modeling beam is incident on the first light guide unit at a specific angle to the second axis 2. A scanning pattern may be a pattern formed as a plurality of line scans having the direction parallel to the second axis 2 is stepped at specific intervals in the direction of the first axis 1 (hereinafter referred to as a "first scanning pattern"). FIGS. 3 and 6 show one embodiment of the first scanning pattern.

Figure 4:
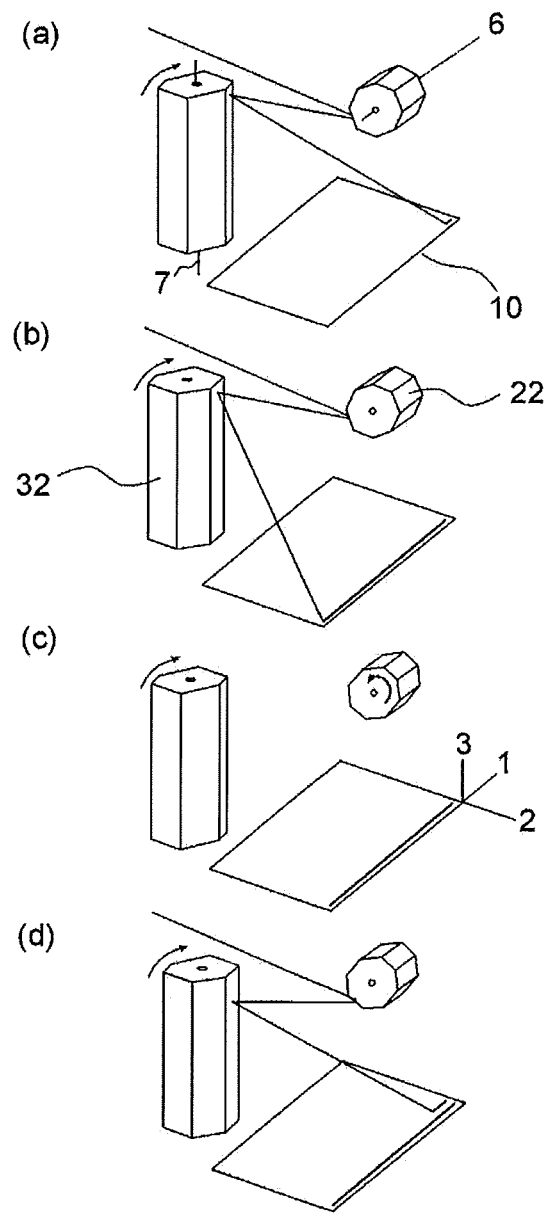
FIG. 4 is a perspective view showing one embodiment (a (2-1)-th configuration) of a method for scanning a modeling plane using the head apparatus of the three-dimensional modeling equipment according to the present invention.
Figure 5:
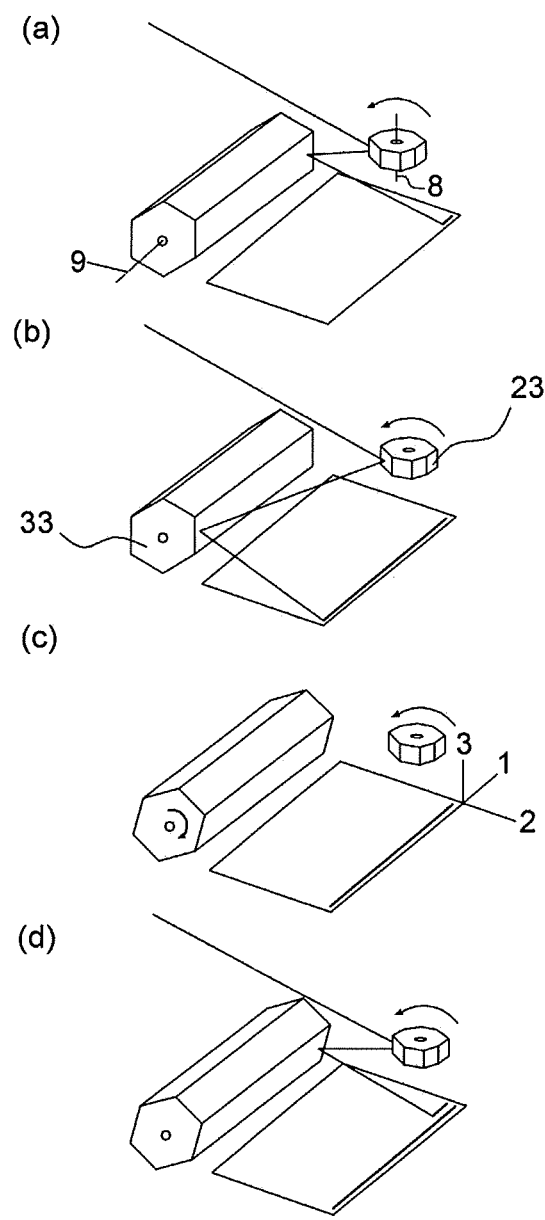
FIG. 5 is a perspective view showing one embodiment (a (2-2)-th configuration) of a method for scanning a modeling plane using the head apparatus of the three-dimensional modeling equipment according to the present invention.

Furthermore, a modeling beam is incident on the first light guide unit 20 at a specific angle to the second axis 2. A scanning pattern may be a pattern formed as a plurality of line scans having the direction parallel to the first axis 1 is stepped at specific intervals in the direction of the second axis 2 (hereinafter referred to as a "second scanning pattern"). One embodiment of such a pattern is shown in FIGS. 4 and 5.

The modeling beams in the first scanning pattern and the second scanning pattern may be incident in parallel to the second axis 2, and may be incident in a direction in which the modeling beams are not included in a plane formed by the second axis 2 and the third axis 3. The incident direction of the modeling beam may be determined in relation to the location where the first light guide unit 20 and the second light guide unit 30 are installed.

Hereinafter, there is proposed a configuration for arranging major elements, such as the first light guide unit 20, the second light guide unit 30 and the modeling beam source unit 15, in order to implement the first scanning pattern and the second scanning pattern. Such a proposal is for implementing a required function using minimum elements. It may be said that a more complicated configuration based on a change or modification in some of the configuration using a reflection mirror, a prism and other optical elements falls within the same and/or equivalent range as the configuration of the present invention.

In order to implement the first scanning pattern, there are proposed a configuration of two elements in the head apparatus of the three-dimensional modeling equipment of the present invention.

First, regarding the '(1-1)-th configuration', the first light guide unit 20 is configured to include a first polygon mirror 21. The first polygon mirror 21 is disposed using a fourth axis 4 parallel to the first axis 1 as its rotating central axis. The second light guide unit 30 is configured to include the second polygon mirror 31. The second polygon mirror 31 is disposed using a fifth axis 5 parallel to the third axis 3 as its rotating central axis. A plurality of line scans in the direction parallel to the second axis 2 is performed when the first polygon mirror 21 is rotated, and the stepping of the plurality of line scans at a specific interval in the direction of the first axis 1 is performed when the second polygon mirror 31 is rotated. If the value of the interval of the stepping is too small, it is inefficient because a modeling beam is radiated to a portion on which a line scan and curing have already been performed again. If the value of the interval of the stepping is too great, a portion to which a modeling beam has not been radiated is generated. As described above, one line scan is performed by one side reflection surface of the first polygon mirror 21 in which the incident angle of a modeling beam continues to change while the first polygon mirror 21 is rotated. If the first polygon mirror 21 continues to rotate in one direction, control of a modeling beam while it moves from one side reflection surface of the first polygon mirror 21 to another adjacent side reflection surface thereof may be performed by turning off the output of the modeling beam source unit, by blocking the modeling beam using an additional element, such as a shutter, or by applying a method using a shield film disposed near the modeling plane. A method for lowering the output of a modeling beam to the extent that the curing or sintering action of a modeling material is not generated although the modeling beam is incident on the modeling plane may be taken into consideration. One embodiment of such a configuration is shown in FIG. 3.

Figure 10:
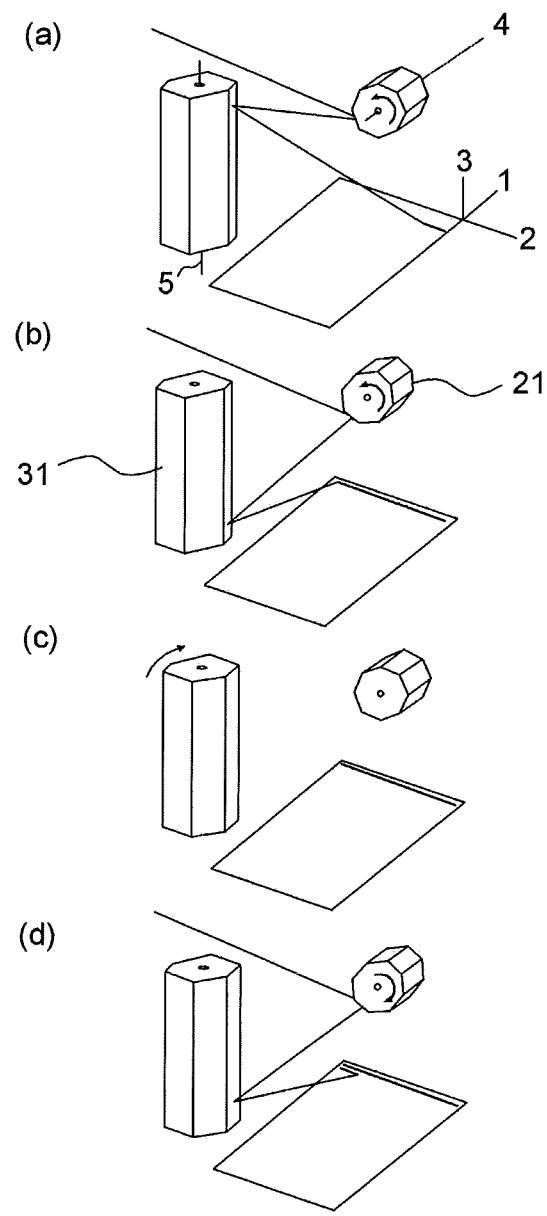
FIG. 10 is an explanatory diagram showing a procedure when a first polygon mirror 21 is rotated forward and backward in the one embodiment (the (1-1)-th configuration) of the method for scanning the modeling plane 10 using the head apparatus of the three-dimensional modeling equipment according to the present invention.

Furthermore, if the first polygon mirror 21 is alternately rotated forward and backward, only one side reflection surface of the first polygon mirror 21 is used in all of the line scans. One embodiment of such a configuration is shown in FIG. 10. Such a configuration is not preferred. This is described later.

Regarding the (1-2)-th configuration, one embodiment of such a configuration is shown in FIG. 6. The first light guide unit 20 is configured to include a seventh polygon mirror 24. The seventh polygon mirror 24 is disposed using a tenth axis 10x parallel to the third axis 3 as its rotating central axis. The second light guide unit 30 is configured to include an eighth polygon mirror 34. The eighth polygon mirror 34 is disposed using an eleventh axis 11x parallel to the first axis 1 as its rotating central axis. A plurality of line scans in the direction parallel to the second axis 2 is performed when the eighth polygon mirror 34 is rotated. The stepping of the plurality of line scans at a specific interval in the direction of the first axis 1 is performed when the seventh polygon mirror 24 is rotated. As described above, one line scan may be performed by one side reflection surface of the eighth polygon mirror 34 in which the incident angle of a modeling beam continues to change while the eighth polygon mirror 34 is rotated. Since the eighth polygon mirror 34 continues to rotate in one direction, control of a modeling beam while it moves from one side reflection surface of the eighth polygon mirror 34 to another adjacent side reflection surface thereof may be performed by turning off the output of the modeling beam source unit, by blocking the modeling beam using an additional element, such as a shutter, or by applying a method using a shield film disposed near the modeling plane. A method for lowering the output of a modeling beam to the extent that the curing or sintering action of a modeling material is not generated although the modeling beam is incident on the modeling plane may be taken into consideration. Furthermore, if the seventh polygon mirror 24 is alternately rotated forward and backward, only one side reflection surface of the seventh polygon mirror 24 is used in all of the line scans.

In order to implement the second scanning pattern, a configuration of two elements is proposed in the head apparatus of the three-dimensional modeling equipment of the present invention.

First, regarding a '(2-1)-th configuration', one embodiment of such a configuration is shown in FIG. 4. The first light guide unit 20 is configured to include a third polygon mirror 22. The third polygon mirror 22 is disposed using a sixth axis 6 parallel to the first axis 1 as its rotating central axis. The second light guide unit 30 is configured to include a fourth polygon mirror 32. The fourth polygon mirror 32 is disposed using a seventh axis 7 parallel to the third axis 3 as its rotating central axis. A line scan in the direction parallel to the first axis 1 is performed when the fourth polygon mirror 32 is rotated. Stepping at a specific interval in the direction of the second axis 2 is performed when the third polygon mirror 22. One line scan is performed by one side reflection surface of the fourth polygon mirror 32 in which the incident angle of a modeling beam continues to change while the fourth polygon mirror 32 is rotated. If the fourth polygon mirror 32 continues to rotate in one direction, control of a modeling beam while it moves from one side reflection surface of the fourth polygon mirror 32 to another adjacent side reflection surface thereof may be performed by turning off the output of the modeling beam source unit, by blocking the modeling beam using an additional element, such as a shutter, or by applying a method using a shield film disposed near the modeling plane. A method for lowering the output of a modeling beam to the extent that the curing or sintering action of a modeling material is not generated although the modeling beam is incident on the modeling plane may be taken into consideration. Furthermore, the stepping of each line scan in the direction of the second axis 2 is generated as the third polygon mirror 22 rotates at specific angular displacement and as a result, the location where a modeling beam is reflected in the side reflection surface of the fourth polygon mirror 32 is stepped. Furthermore, if the fourth polygon mirror 32 is alternately rotated forward and backward, only one side reflection surface of the fourth polygon mirror 32 is used in all of the line scans (In this case, such a configuration is not preferred. This is described later.)

Next, regarding the '(2-2)-th configuration', one embodiment of such a configuration is shown in FIG. 5. The first light guide unit 20 is configured to include a fifth polygon mirror 23. The fifth polygon mirror 23 is disposed using an eighth axis 8 that forms a specific angle to the third axis 3 as its rotating central axis. The second light guide unit 30 is configured to include a sixth polygon mirror 33. The sixth polygon mirror 33 is disposed using a ninth axis 9 parallel to the first axis 1 as its rotating central axis. A plurality of line scans in the direction parallel to the first axis 1 may be performed when the fifth polygon mirror 23 is rotated. Stepping at a specific interval in the direction of the second axis 2 is performed when the sixth polygon mirror is rotated. One line scan is performed by one side reflection surface of the fifth polygon mirror 23 in which the incident angle of a modeling beam continues to change while the fifth polygon mirror 23 is rotated. If the fifth polygon mirror 23 continues to rotate in one direction, control of a modeling beam while it moves from one side reflection surface of the fifth polygon mirror 23 to another adjacent side reflection surface thereof may be performed by turning off the output of the modeling beam source unit, by blocking the modeling beam using an additional element, such as a shutter, or by applying a method using a shield film disposed near the modeling plane. A method for lowering the output of a modeling beam to the extent that the curing or sintering action of a modeling material is not generated although the modeling beam is incident on the modeling plane may be taken into consideration. Furthermore, the stepping of each line scan in the direction of the second axis 2 is generated as the sixth polygon mirror 33 rotates at specific angular displacement and thus the location where a modeling beam is reflected is stepped. Furthermore, if the fifth polygon mirror 23 is alternately rotated forward and backward, only one side reflection surface of the fifth polygon mirror 23 is used in all of the line scans.

A method for scanning the modeling plane 10 using the head apparatus of the three-dimensional modeling equipment of the present invention is described below. To this end, it is a precondition that a modeling material is actually supplied to the aforementioned modeling plane 10 and located therein. When the scanning of a modeling beam for one modeling plane 10 is completed, one modeling layer is formed. Such modeling layers are stacked to form one three-dimensional model. In the scanning of the modeling plane 10, a portion to which a modeling beam has not been radiated should not be present. It is preferred that scanning is performed through an optimal path capable of minimizing a required scanning time.

First, a method for scanning the modeling plane 10 using the head apparatus of the three-dimensional modeling equipment having the '(1-1)-th configuration' is described. First, the first polygon mirror 21 is rotated in one direction, and the modeling beam source unit 15 starts to enable a modeling beam to be incident on the first polygon mirror 21. Second, while the first polygon mirror 21 continues to rotate at a specific speed, the modeling beam primarily reflected by the first polygon mirror 21 is secondarily reflected by the second polygon mirror 31, and performs a line scan on the modeling plane 10 in the direction parallel to the second axis 2. Third, a modeling beam 11 is controlled so that it is not radiated to the modeling plane 10, so the line scan in the second step is terminated. At this time, control may be performed by turning off the output of the modeling beam source unit, by using an additional element, such as a shutter, or by using a shield film disposed near the modeling plane. A method for lowering the output of the modeling beam to the extent that the curing or sintering action of a modeling material is not generated although the modeling beam is incident on the modeling plane may be taken into consideration. Fourth, after the line scan in the second step, in order to perform a next line scan after stepping at a specific interval in the direction of the first axis 1, the second polygon mirror 31 rotates at specific angular displacement and the first polygon mirror 21 continues to rotate in the same direction until a next reflection surface adjacent to a previous reflection surface reaches a specific location. At this time, if the rotation of the second polygon mirror 31 and the rotation of the first polygon mirror 21 are performed at the same time, a total modeling time can be reduced. Fifth, the first step to the fourth step are repeatedly performed until the radiation of the modeling beam to the entire surface of the modeling plane 10 is completed. In this method, it is preferred that the first polygon mirror 21 is rotated in one specific direction only. If the first polygon mirror 21 is rotated in one direction only as described above, the time taken between one line scan and a next line scan can be minimized and the time taken for the first polygon mirror 21 to be accelerated from a stop state can be minimized. Accordingly, an overall modeling time can be reduced. In this case, the first polygon mirror 21 may be configured to alternately rotate forward and backward as in a case shown in FIG. 10. In such a configuration, however, an actual profit using the present invention is reduced because the time taken for each line scan is increased due to the repetition of the forward rotation-stop-backward rotation-stop of the first polygon mirror 21. Furthermore, an electric motor element for driving the first polygon mirror 21 becomes complicated, and a good possibility that vibration and noise may be seriously generated in the repeated process must be taken into consideration. It is evident that the second polygon mirror 31 has to continue to rotate in one direction in the process of performing radiation on the one modeling plane 10. In this case, when radiation to a next modeling plane 10 is performed after the one modeling plane 10 is illuminated, the second polygon mirror 31 may rotate in the same direction as the rotating direction in the radiation process for the previous modeling plane 10 or the second polygon mirror 31 may rotate in the direction opposite the rotating direction in the radiation process for the previous modeling plane 10. The reason for this is that a problem, such as that in the first polygon mirror 21 is not generated because the second polygon mirror 31 has to be in the stop state while a line scan is performed. In this case, in the latter case, the second polygon mirror 31 does not need to be essentially configured to have a mirror of a polygon form.

First, a method for scanning the modeling plane 10 using the head apparatus of the three-dimensional modeling equipment having the '(1-2)-th configuration' is described. An embodiment of the procedure of the method is shown in FIG. 6. First, the eighth polygon mirror 34 rotates in one direction and the modeling beam source unit 15 starts to enable a modeling beam to be incident on the seventh polygon mirror 24. Second, while the eighth polygon mirror 34 continues to rotate at a specific speed, the modeling beam primarily reflected by the seventh polygon mirror 24 is secondarily reflected by the eighth polygon mirror 34, and performs a line scan on the modeling plane 10 in the direction parallel to the second axis 2. Third, the modeling beam 11 is controlled so that it is not radiated to the modeling plane 10, and thus the line scan in the second step is terminated. At this time, control may be performed by turning off the output of the modeling beam source unit, by using an additional element, such as a shutter, or by using a shield film disposed near the modeling plane. A method for lowering the output of the modeling beam to the extent that the curing or sintering action of a modeling material is not generated although the modeling beam is incident on the modeling plane may be taken into consideration. Fourth, after the line scan in the second step, in order to perform a next line scan after stepping a specific interval in the direction of the first axis 1, the seventh polygon mirror rotates at specific angular displacement and the eighth polygon mirror 34 continues to rotate in the same direction until a next reflection surface adjacent to a previous reflection surface reaches a specific location. At this time, if the rotation of the eighth polygon mirror 34 and the rotation of the seventh polygon mirror 24 are performed at the same time, a total modeling time can be reduced. Fifth, the first step to the fourth step are repeatedly performed until the radiation of the modeling beam to the entire surface of the modeling plane 10 is completed. In this method, it is preferred that the eighth polygon mirror 34 is rotated in one specific direction only. If the eighth polygon mirror 34 is rotated in one direction only as described above, the time taken between one line scan and a next line scan can be minimized, and the time necessary for the eighth polygon mirror 34 to be accelerated from a stop state can also be minimized. Accordingly, an overall modeling time can be reduced. In this case, the eighth polygon mirror 34 may be configured to alternately rotate forward and backward. In such a configuration, an actual profit using the present invention is reduced because the time taken for each line scan is increased due to the repetition of the forward rotation-stop-backward rotation-stop of the eighth polygon mirror 34. Furthermore, an electric motor element for driving the eighth polygon mirror 34 becomes complicated, and a good possibility that vibration and noise may be seriously generated in the repeated process must be taken into consideration. It is evident that the seventh polygon mirror 24 has to continue to rotate in one direction in the process of performing radiation on the one modeling plane 10. In this case, when radiation to a next modeling plane 10 is performed after the radiation to the one modeling plane 10 is terminated, the seventh polygon mirror 24 may rotate in the same direction as the rotating direction in the radiation process for the previous modeling plane 10 or the seventh polygon mirror 24 may rotate in the direction opposite the rotating direction in the radiation process for the previous modeling plane 10. The reason for this is that a problem, such as that in the eighth polygon mirror 34 is not generated because the seventh polygon mirror 24 has to be in the stop state while a line scan is performed. In this case, in the latter case, the seventh polygon mirror 24 does not need to be essentially configured to have a mirror of a polygon form.

Next, a method for scanning the modeling plane 10 using the head apparatus of the three-dimensional modeling equipment having the '(2-1)-th configuration' is described. First, the fourth polygon mirror 32 rotates in one direction, and the modeling beam source unit 15 starts to enable a modeling beam to be incident on the third polygon mirror 22. Second, while the fourth polygon mirror 32 continues to rotate at a specific speed, the modeling beam primarily reflected by the third polygon mirror 22 is secondarily reflected by the fourth polygon mirror 32, and performs a line scan on the modeling plane 10 in the direction parallel to the first axis 1. Third, the modeling beam 11 is controlled so that it is not radiated to the modeling plane 10, and the line scan in the second step is terminated. At this time, control may be performed by turning off the output of the modeling beam source unit, by using an additional element, such as a shutter, or by using a shield film disposed near the modeling plane. A method for lowering the output of the modeling beam to the extent that the curing or sintering action of a modeling material is not generated although the modeling beam is incident on the modeling plane may be taken into consideration. Fourth, after the line scan in the second step, in order to perform a next line scan after stepping at a specific interval in the direction of the second axis 2, the third polygon mirror 22 rotates at specific angular displacement and the fourth polygon mirror 32 continues to rotate in the same direction until a next reflection surface adjacent to a previous reflection surface reaches a specific location. At this time, if the rotation of the third polygon mirror 22 and the rotation of the fourth polygon mirror 32 are performed at the same time, a total modeling time can be reduced. Fifth, the first step to the fourth step are repeatedly performed until the radiation of the modeling beam to the entire surface of the modeling plane 10 is completed. In this method, it is preferred that the fourth polygon mirror 32 is rotated in one specific direction only. Furthermore, the third polygon mirror has to continue to rotate in the same direction in the process of radiating the modeling beam to the one modeling plane 10. However, when the radiation to the next modeling plane 10 starts, the third polygon mirror 22 may start to rotate in the same direction as the rotating direction in the radiation for the previous modeling plane 10 or may start to rotate in the direction opposite the rotating direction in the radiation for the previous modeling plane 10. In the latter case, the third polygon mirror 22 does not need to be essentially configured to have a mirror of a polygon form.

Next, a method for scanning the modeling plane 10 using the head apparatus of the three-dimensional modeling equipment having the '(2-2)-th configuration' is described. First, the fifth polygon mirror 23 rotates in one direction, and the modeling beam source unit 15 starts to enable a modeling beam to be incident on the fifth polygon mirror 23. Second, while the fifth polygon mirror 23 continues to rotate at a specific speed, the modeling beam primarily reflected by the fifth polygon mirror 23 is secondarily reflected by the sixth polygon mirror 33, and performs a line scan on the modeling plane 10 in the direction parallel to the first axis 1. Third, the modeling beam 11 is controlled so that it is not radiated to the modeling plane 10, and thus the line scan in the second step is terminated. At this time, control may be performed by turning off the output of the modeling beam source unit, by using an additional element, such as a shutter, or by using a shield film disposed near the modeling plane. A method for lowering the output of the modeling beam to the extent that the curing or sintering action of a modeling material is not generated although the modeling beam is incident on the modeling plane may be taken into consideration. Fourth, after the line scan in the second step, in order to perform a next line scan after stepping at a specific interval in the direction of the first axis 1, the sixth polygon mirror 33 rotates at specific angular displacement and the fifth polygon mirror 23 continues to rotate in the same direction until a next reflection surface adjacent to a previous reflection surface reaches a specific location. At this time, if the rotation of the sixth polygon mirror 33 and the rotation of the fifth polygon mirror 23 are performed at the same time, a total modeling time can be reduced. Fifth, the first step to the fourth step are repeatedly performed until the radiation of the modeling beam to the entire surface of the modeling plane 10 is completed. In this method, it is preferred that the fifth polygon mirror 23 is rotated in one specific direction only. Furthermore, the sixth polygon mirror 33 has to continue to rotate in the same direction in the process of radiating the modeling beam to the one modeling plane 10. However, when the radiation to the next modeling plane 10 starts, the sixth polygon mirror 33 may start to rotate in the same direction as the rotating direction in the radiation for the previous modeling plane 10 or may start to rotate in the direction opposite the rotating direction in the radiation for the previous modeling plane 10. In the latter case, the sixth polygon mirror 33 does not need to be essentially configured to have a mirror of a polygon form Although the present invention has been described along with the accompanying drawings, this is only one of various embodiments including the gist of the present invention and has an object of enabling a person having ordinary skill in the art to easily practice the invention. Accordingly, it is evident that the present invention is not limited to the aforementioned embodiments. Accordingly, the range of protection of the present invention should be interpreted based on the following claims, and all of technological spirits within the equivalents of the present invention may fall within the range of right of the present invention by changes, substitutions and replacements without departing from the gist of the present invention. Furthermore, it is evident that the configurations of some drawings have been provided to more clearly describe configurations and have been more exaggerated or reduced than actual configurations.

REFERENCE NUMERALS FROM THE FIGURES

1: first axis
2: second axis
3: third axis
4: fourth axis
5: fifth axis
6: sixth axis
7: seventh axis
8: eighth axis
9: ninth axis
10x: tenth axis
11x: eleventh axis
10: modeling plane
11: modeling beam
12: line scan
15: modeling beam source unit
20: the first light guide unit
21: first polygon mirror
22: third polygon mirror
23: fifth polygon mirror
24: seventh polygon mirror
30: second light guide unit
31: second polygon mirror
32: fourth polygon mirror
33: sixth polygon mirror
34: eighth polygon mirror
40: control unit
41: first photosensor
42: second photosensor
43: third photosensor
44: fourth photosensor
50: modeling beam incident angle correction unit

What is claimed is:

1. A head apparatus for three-dimensional modeling equipment, the head apparatus comprising:

a modeling beam source unit for generating and radiating a modeling beam in a specific scanning pattern to a surface of a modeling plane having first and second perpendicular axes and being perpendicular to a third axis;

a first light guide unit disposed at a specific location so as to be over the modeling plane and being configured to primarily reflect the modeling beam from the modeling beam source unit and to enable the primarily reflected modeling beam to be incident on a second light guide unit;

the second light guide unit being disposed at a specific location so as to be over the modeling plane and configured to secondarily reflect the modeling beam incident from the first light guide unit and to enable the secondarily reflected modeling beam to be incident on the modeling plane; and a control unit which generates an on/off and output power of the modeling beam and a driving of the first light guide unit and the second light guide unit by associating the first light guide unit and the second light guide unit, wherein the first light guide unit includes a first polygon mirror and the second light guide unit includes a second polygon mirror, each of the first polygon mirror and the second polygon mirror having a specific number of light reflection surfaces and being rotatable in one direction around a specific rotating axis; and wherein the control unit comprises:

a first photosensor configured to determine start timing of each of a plurality of line scans in a direction parallel to the first axis or the second axis by sensing the modeling beam when the modeling beam is incident on a first specific point, the first specific point corresponding to a top surface of the second polygon mirror, and to synchronize driving of the modeling beam source unit and driving of the first light guide unit or the second light guide unit, the first photosensor being disposed over the top surface of the second polygon mirror to detect a reflection of the modeling beam toward the top surface of the second polygon mirror before a next line scan is started after one line scan is terminated.

2. The head apparatus of claim 1, comprising:
a modeling beam incident angle correction unit configured to enable the modeling beam to be vertically incident on the modeling plane in all of points forming the modeling plane.

3. The head apparatus of claim 1, wherein the control unit is configured to control a pulse amplitude or pulse frequency of the modeling beam in order to correct a difference in a path length which is necessary for the modeling beam to reach each of points forming the modeling plane or a difference in output power density of a modeling beam in each of the points which is caused depending on a difference in an incident angle of the modeling beam.

4. The head apparatus of claim 1, wherein the control unit comprises:
an array of the first photosensors.

5. The head apparatus of claim 4, wherein the control unit comprises:
a fourth photosensor configured to determine end timing of each of the plurality of line scans in the direction parallel to the first axis or the second axis by sensing the modeling beam when the modeling beam is incident on a second specific point, the second specific point corresponding to a bottom surface of the second polygon mirror, and to synchronize driving of the modeling beam source unit and driving of the first light guide unit or the second light guide unit,
wherein the fourth photosensor is disposed under the second polygon mirror to determine the end timing of each line scan of the plurality of line scans.

6. The head apparatus of claim 1, wherein the control unit comprises:
a second photosensor configured to determine first start timing of a radiation of the modeling beam to the modeling plane by sensing the modeling beam incident on a specific location of the modeling plane and to synchronize driving of the modeling beam source unit and driving the first light guide unit or the second light guide unit.

7. The head apparatus of claim 6, wherein the control unit comprises:
a third photosensor configured to determine final end timing of the radiation of the modeling beam to the modeling plane by sending the modeling beam incident to a specific location of the modeling plane.

8. The head apparatus of claim 1, configured such that:
the modeling beam will be incident on the first light guide unit while forming a specific angle to the second axis; and
the scanning pattern is to be a pattern formed as a plurality of line scans having a direction parallel to the first axis is stepped at a specific interval in the direction of the second axis.

9. The head apparatus of claim 8, wherein:
the first light guide unit includes a third polygon mirror;
the third polygon mirror is disposed using a sixth axis parallel to the first axis as its rotating central axis;
the second light guide unit includes a fourth polygon mirror;
the fourth polygon mirror is disposed using a seventh axis parallel to the third axis as its rotating central axis;
the line scan in a direction parallel to the first axis is to be performed as the fourth polygon mirror is rotated; and
stepping at a specific interval in the direction of the second axis is to be performed as the third polygon mirror is rotated.

10. The head apparatus of claim 8, wherein:
the first light guide unit includes a fifth polygon mirror;
the fifth polygon mirror is disposed using an eighth axis having a specific angle to the third axis as its rotating central axis;
the second light guide unit includes a sixth polygon mirror;
the sixth polygon mirror is disposed using a ninth axis parallel to the first axis as its rotating central axis;
a plurality of line scans in the direction parallel to the first axis is to be performed as the fifth polygon mirror is rotated; and
stepping at a specific interval in the direction of the second axis is to be performed as the sixth polygon mirror is rotated.

11. The head apparatus of claim 1, configured such that:
the modeling beam will be incident on the first light guide unit while forming a specific angle to the second axis; and
the scanning pattern is configured to be a pattern formed as a plurality of line scans having a direction parallel to the second axis is stepped at a specific interval in the direction of the first axis.

12. The head apparatus of claim 11, wherein:
the first polygon mirror is disposed using a fourth axis parallel to the first axis as its rotating central axis;
the second polygon mirror is disposed using a fifth axis parallel to the third axis as its rotating central axis;
the plurality of line scans in the direction parallel to the second axis is to be performed as the first polygon mirror is rotated; and
stepping at a specific interval in the direction of the first axis is performed as the second polygon mirror is rotated.

13. The head apparatus of claim 11, wherein:
the first light guide unit includes a seventh polygon mirror;
the seventh polygon mirror is disposed using a tenth axis parallel to the third axis as its rotating central axis;
the second light guide unit includes an eighth polygon mirror;
the eighth polygon mirror is disposed using an eleventh axis parallel to the first axis as its rotating central axis;
a plurality of line scans in a direction parallel to the second axis is performed as the eighth polygon mirror is rotated; and
stepping at a specific interval in the direction of the first axis is performed as the seventh polygon mirror is rotated.

* * * * *